US012658492B2

(12) United States Patent
Bhavsar et al.

(10) Patent No.: US 12,658,492 B2
(45) Date of Patent: Jun. 16, 2026

(54) SINGLE-PIECE OVER-MOLDED COOLANT SUBSYSTEM

(71) Applicant: GM GLOBAL TECHNOLOGY OPERATIONS LLC, Detroit, MI (US)

(72) Inventors: Tejas R. Bhavsar, Troy, MI (US); Mahesh A. Mummigatti, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 485 days.

(21) Appl. No.: 18/319,029

(22) Filed: May 17, 2023

(65) Prior Publication Data

US 2024/0387895 A1     Nov. 21, 2024

(51) Int. Cl.
| | |
|---|---|
| *H01M 10/613* | (2014.01) |
| *H01M 10/625* | (2014.01) |
| *H01M 10/643* | (2014.01) |
| *H01M 10/653* | (2014.01) |
| *H01M 10/6557* | (2014.01) |
| *H01M 50/213* | (2021.01) |
| *H01M 50/227* | (2021.01) |

(52) U.S. Cl.
CPC ....... *H01M 10/613* (2015.04); *H01M 10/625* (2015.04); *H01M 10/643* (2015.04); *H01M 10/653* (2015.04); *H01M 10/6557* (2015.04); *H01M 50/213* (2021.01); *H01M 50/227* (2021.01); *Y02E 60/10* (2013.01)

(58) Field of Classification Search
CPC ............. H01M 10/613; H01M 10/625; H01M 10/643; H01M 10/653; H01M 10/6557; H01M 50/213; H01M 50/227; Y02E 60/10
See application file for complete search history.

(56) References Cited

U.S. PATENT DOCUMENTS

| | | | | |
|---|---|---|---|---|
| 2005/0260488 A1* | 11/2005 | Zhou | .................. | H01M 50/209 |
| | | | | 180/68.5 |
| 2009/0214940 A1* | 8/2009 | Haussmann | ........ | H01M 50/271 |
| | | | | 429/151 |
| 2010/0104938 A1* | 4/2010 | Hermann | ............ | H01M 10/653 |
| | | | | 429/120 |
| 2011/0135975 A1* | 6/2011 | Fuhr | .................. | H01M 50/249 |
| | | | | 429/88 |

(Continued)

*Primary Examiner* — Lingwen R Zeng
(74) *Attorney, Agent, or Firm* — Quinn IP Law

(57)     ABSTRACT

A multi-cell rechargeable energy storage system (RESS) includes a plurality of battery cells arranged in rows and a single-piece cooling subsystem configured to remove thermal energy from the plurality of battery cells. The cooling subsystem includes a cell holder constructed from an impact-resistant material defining a plurality of pockets, wherein each pocket is configured to accept and retain one of the plurality of battery cells. The cooling subsystem also includes a coolant header disposed within the cell holder and having a plurality of ribbon coolant lines arranged in parallel and configured to circulate a coolant between individual battery cells. In a cross-sectional view, each ribbon coolant line is arranged inside the cell holder and over-molded and encased by a thermal interface material (TIM). Adjacent ribbon coolant lines embrace one row of the battery cells. A method of constructing the single-piece cooling subsystem is also included.

20 Claims, 7 Drawing Sheets

(56)        References Cited

U.S. PATENT DOCUMENTS

2013/0171493 A1* 7/2013 Wayne ............. H01M 10/6557
                                               165/104.19
2023/0063609 A1* 3/2023 Pham ................. H01M 50/519

* cited by examiner

SINGLE-PIECE OVER-MOLDED COOLANT SUBSYSTEM

The present disclosure relates to a single-piece over-molded coolant subsystem for a multi-cell rechargeable energy storage system (RESS).

Typically, an electric energy generation and storage battery system includes one or more battery cells for powering a load. A plurality of battery cells may be arranged in close proximity to one another to generate a battery module or array. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Exposure of a battery cell to elevated temperatures over prolonged periods may cause the cell to experience a thermal runaway event, where heat build-up in individual cell leads to the heat spreading to adjacent cells in the module and affecting the entire battery array. Accordingly, thermal energy needs to be effectively removed to mitigate heat build-up and consequent degradation of battery system performance. Generally, devices such as heat-sinks or cold-plates with circulating coolant are employed to remove heat from battery systems.

SUMMARY

A multi-cell rechargeable energy storage system (RESS) includes a plurality of battery cells arranged in rows and a single-piece cooling subsystem configured to remove thermal energy from the plurality of battery cells. The cooling subsystem includes a cell holder constructed from an impact-resistant material defining a plurality of pockets, wherein each pocket is configured to accept and retain one of the plurality of battery cells. The cooling subsystem also includes a coolant header disposed within the cell holder. The cell header includes a plurality of ribbon coolant lines arranged in parallel and configured to circulate a coolant between individual battery cells. Each ribbon coolant line is, in a cross-sectional view, arranged inside the cell holder and over-molded and encased by a thermal interface material (TIM). Each pair of adjacent ribbon coolant lines embraces one row of the plurality of battery cells. The RESS may further include a coolant inlet fitting and a coolant outlet fitting, wherein each coolant fitting is in fluid communication with the coolant header.

Each battery cell may include a polyethylene terephthalate (PET) isolation layer. The PET isolation layer may be disposed on the outer surface of the respective battery cell, directly against the TIM.

In the cross-sectional view, the PET isolation layer may have a 0.1 mm thickness.

Each of the plurality of battery cells may include a first end having an electric terminal. In such an embodiment, the RESS may further include a tab connector configured to electrically connect the electric terminals of the plurality of battery cells. The tab connector may be covered by a potting material.

Each of the plurality of battery cells may include a second end having a gas vent. The cell holder may define a plurality of integrated apertures. In such an embodiment, each integrated aperture may be configured to interface with a respective gas vent of one of the plurality of battery cells.

The cell holder may include a longitudinal passage extending along at least one row of the plurality of battery cells. Each of the plurality of integrated apertures may be configured to direct a gas vented by one of the plurality of battery cells through the gas vent to the longitudinal passage.

The impact-resistant material of the cell holder may be one of acrylonitrile butadiene styrene (ABS), polycarbonate (PC), and polydicyclopentadiene (pDCPD).

The RESS may additionally include an inlet manifold configured to connect with the inlet fitting and an outlet manifold configured to connect with the outlet fitting, such that the inlet and outlet manifolds are together configured to circulate coolant through the coolant header.

Each of the plurality of battery cells may be a cylindrical cell.

A method of constructing the single-piece cooling subsystem configured to remove thermal energy from a plurality of battery cells in a multi-cell rechargeable energy storage system (RESS), as described above, is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
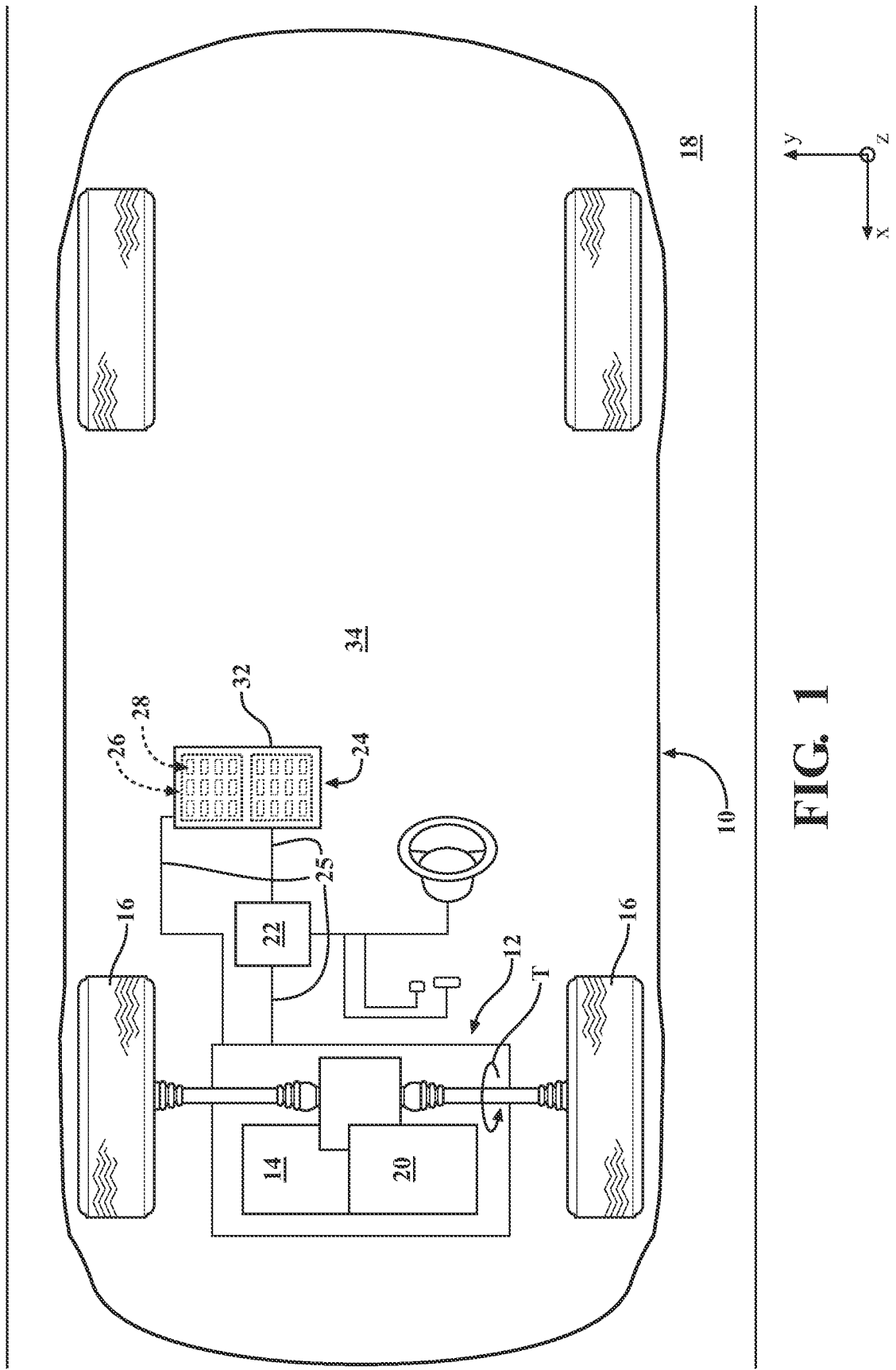
FIG. 1 is a schematic top view of an embodiment of a motor vehicle employing multiple power-sources and a multi-cell rechargeable energy storage system (RESS) configured to generate and store electrical energy used by vehicle systems including the power-sources, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a multi-cell rechargeable energy storage system (RESS) 24 configured to generate and store electrical energy through heat-producing electrochemical reactions for supplying the electrical energy to the power-sources 14 and 20. The electronic controller 22 may be a central processing unit (CPU) that regulates various functions on the vehicle 10, or as a powertrain control module (PCM) configured to control the powertrain 12 to generate a predetermined amount of power-source torque T. The RESS 24 may be connected to the power-sources 14 and 20, the electronic controller 22, as well as other vehicle systems via a high-voltage BUS 25.

Figure 2:
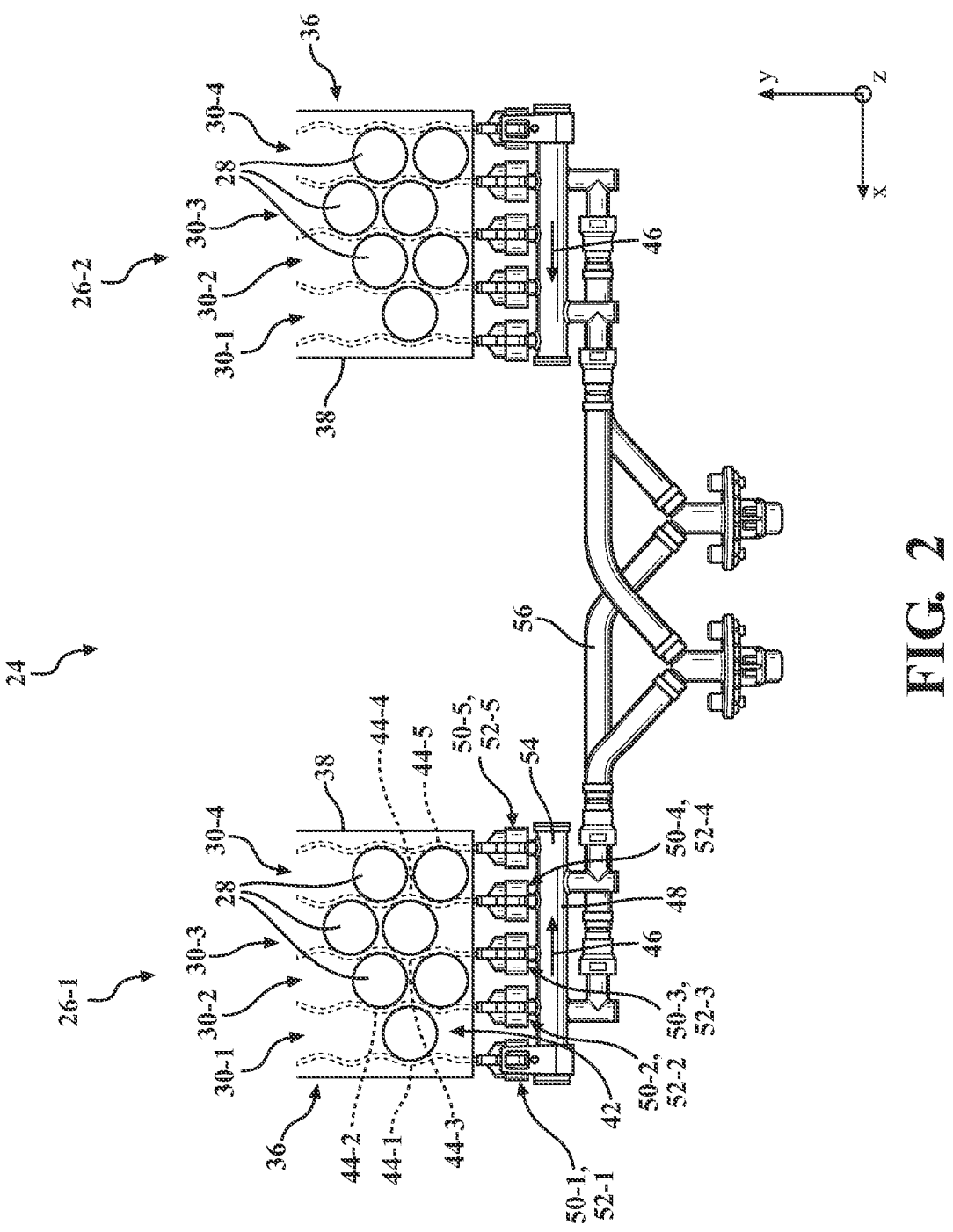
FIG. 2 is a close-up schematic partial top view of the RESS shown in FIG. 1, illustrating a one-piece cooling subsystem for removing thermal energy from the battery cells and a cell holder integrated with a coolant header having multiple ribbon coolant lines over-molded and encased by a thermal interface material (TIM), according to the disclosure.

The RESS 24 includes a plurality of battery cells 28, which may be subdivided into battery groups or modules 26. As shown in FIG. 2, the battery cells 28 in a module 26-1 and module 26-2 of the RESS 24 are arranged in individual rows, specifically including battery cells in a first row 30-1, a neighboring, directly adjacent, second row 30-2, as well as third and fourth rows 30-3 and 30-4. As shown, each battery cell 28 in rows 30-1, 30-2, 30-3, 30-4 may be configured as a cylindrical cell, extending generally upward in an X-Y plane. Although two modules, 26-1 and 26-2, with four rows 30-1, 30-2, 30-3, 30-4 of battery cells 28 in each module are shown, nothing precludes the RESS 24 from having a greater or fewer number of such modules and rows. The remainder of the present description will focus on module construction having four rows 30-1, 30-2, 30-3, 30-4 of battery cells 28, which may be adapted to a specific battery module having a desired overall quantity of cells. As shown in FIG. 1, the RESS 24 also includes a battery pack enclosure 32 surrounded by an ambient environment 34. The battery pack enclosure 32 is configured to house each row 30-1, 30-2, 30-3, 30-4 of the battery cells 28 in respective modules 26-1, 26-2 and includes an enclosure lower portion having an enclosure tray 32-1 and an upper portion having an enclosure cover 32-2 (shown in FIG. 3).

As shown in FIG. 2, RESS 24 also includes a cooling subsystem 36 configured to remove thermal energy from the battery cells 28. The cooling subsystem 36 includes a cell holder 38 constructed from a compliant, impact-resistant material 38A configured to absorb shock and vibration forces. The impact-resistant material 38A of the cell holder 38 may, for example, be acrylonitrile butadiene styrene (ABS), polycarbonate (PC), or polydicyclopentadiene (pDCPD. The cell holder 38 defines a plurality of pockets 40, wherein each pocket is configured to accept and retain one of the plurality of battery cells 28. The cooling subsystem 36 also includes a coolant header 42 disposed within the cell holder 38 and operating as a heat sink for the battery cells 28 in rows 30-1, 30-2, 30-3, 30-4. The coolant header 42 is integrated with the cell holder 38, such that, together, the cell holder and the coolant header combine to form a unitary, undivided structure, as will be described in detail below.

The coolant header 42 includes a plurality of ribbon coolant lines 44-1, 44-2, 44-3, 44-4, 44-5 arranged generally in parallel and configured as individual coolant passages extending proximate the battery cells 28 in rows 30-1, 30-2, 30-3, 30-4. Specifically, the ribbon coolant lines 44-1, 44-2, 44-3, 44-4, and 44-5 are configured to circulate a coolant 46 (indicated by arrows in FIG. 2) through the coolant header 42 between and proximate individual battery cells 28 in rows 30-1, 30-2, 30-3, and 30-4. Each pair of ribbon coolant lines, such as coolant lines 44-1 and 44-2, coolant lines 44-2 and 44-3, coolant lines 44-3 and 44-4, and coolant lines 44-4 and 44-5, is intended to be in contact with and sandwich one corresponding row 30-1, 30-2, 30-3, 30-4 and thereby configured to absorb and remove thermal energy therefrom.

Figure 3:
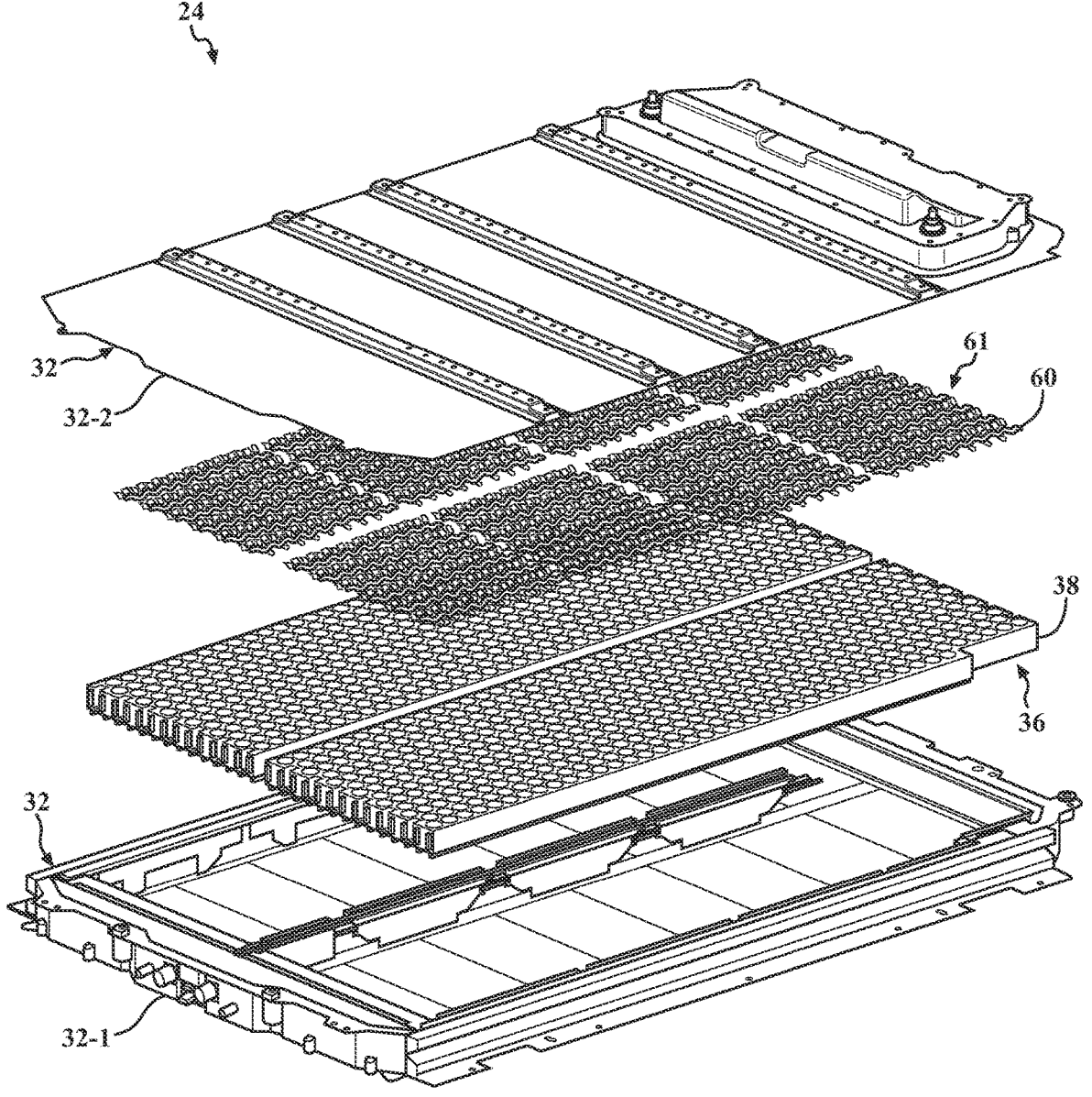
FIG. 3 is a schematic exploded view of the RESS shown in FIG. 2, illustrating the one-piece cooling subsystem relative to a battery pack enclosure.
Figure 4:
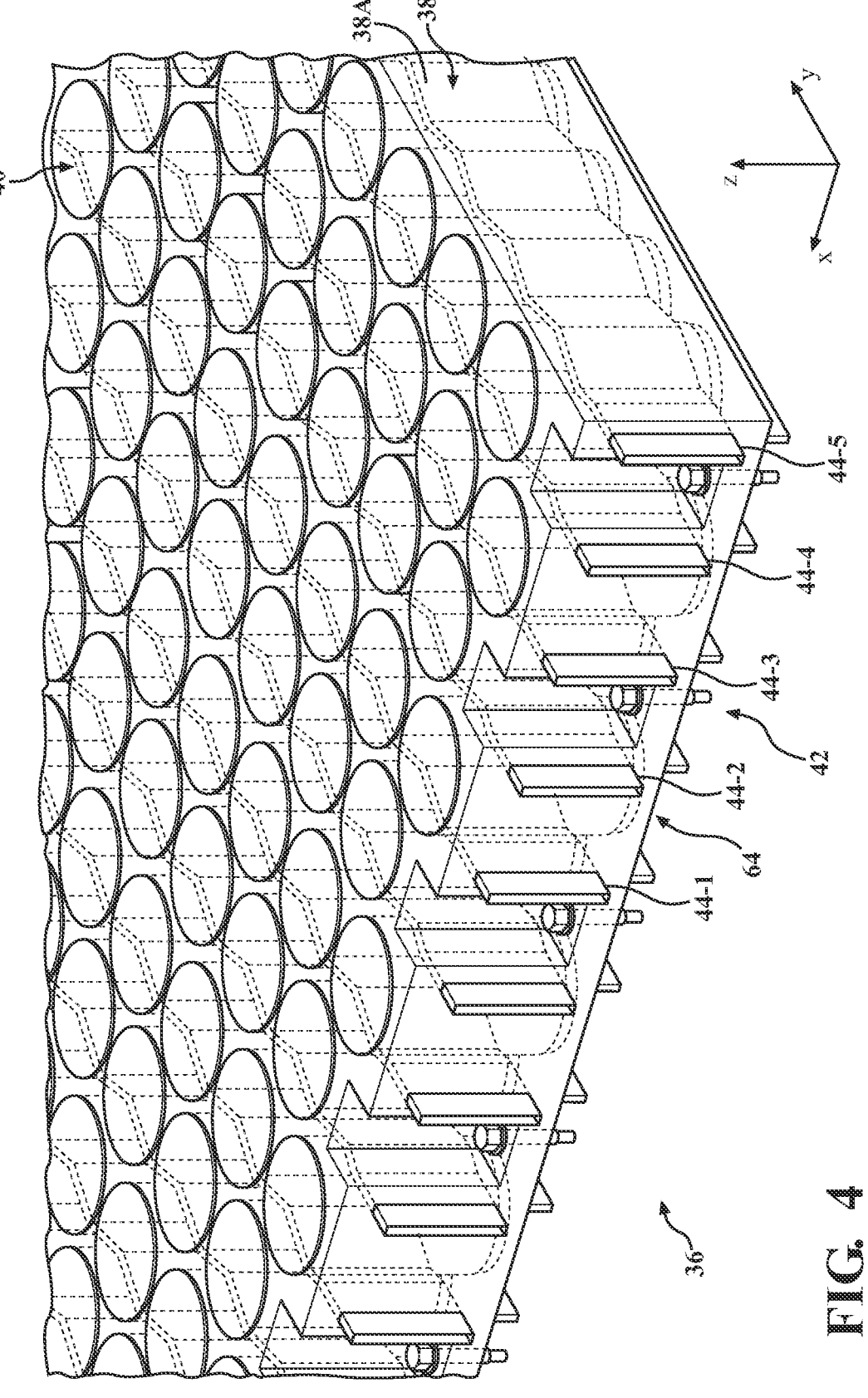
FIG. 4 is a schematic perspective top view of the one-piece cooling subsystem shown in FIG. 2.

Each of the ribbon coolant lines 44-1, 44-2, 44-3, 44-4, 44-5 includes a wave-like shape as shown in a top view in FIG. 2 and in a perspective view in FIG. 4. The wave-like shape of adjacent coolant lines 44-1, 44-2, 44-3, 44-4, and 44-5 is configured to embrace individual battery cells 28. As a result, the ribbon coolant lines 44-1, 44-2, 44-3, 44-4, and 44-5 may be configured to seat the battery cells 28 in individually sandwiched rows 30-1, 30-2, 30-3, and 30-4 and maintain position thereof. As shown in a cross-sectional partial view of the RESS 24 depicted in FIGS. 2-4, each ribbon coolant line 44-1, 44-2, 44-3, 44-4, and 44-5 (indicated in FIG. 5 via general numeral 44-X) is set or arranged inside the cell holder 38 and is over-molded and encased by a thermal interface material (TIM) 48. The cell holder 38 is configured to protect the ribbon coolant lines 44-1, 44-2, 44-3, 44-4, 44-5 from external physical forces. The TIM 48 serves as an intermediate layer between the coolant header 42 and the cell holder 38 and between the coolant header and individual battery cells 28.

With resumed reference to FIG. 2, the coolant header 42 also includes coolant inlet fittings 50-1, 50-2, 50-3, 50-4, 50-5 and coolant outlet fittings 52-1, 52-2, 52-3, 52-4, 52-5. Each of the inlet fittings 50-1, 50-2, 50-3, 50-4, 50-5 and outlet fittings 52-1, 52-2, 52-3, 52-4, 52-5 is fluidly connected to a corresponding ribbon coolant line 44-1, 44-2, 44-3, 44-4, 44-5 for circulating the coolant 46 therethrough. An inlet manifold 54 and an outlet manifold 56 may each be fluidly connected to the inlet fittings 50-1, 50-2, 50-3, 50-4, 5             6 and 50-5. Together, the inlet and outlet manifolds 54, 56 are configured to circulate the coolant 46 through the coolant header 42. Each of the inlet and outlet manifolds 54, 56 may have a respective fluid connection to an external source of the coolant 46, such as a fluid pump (not shown).

Figure 5:
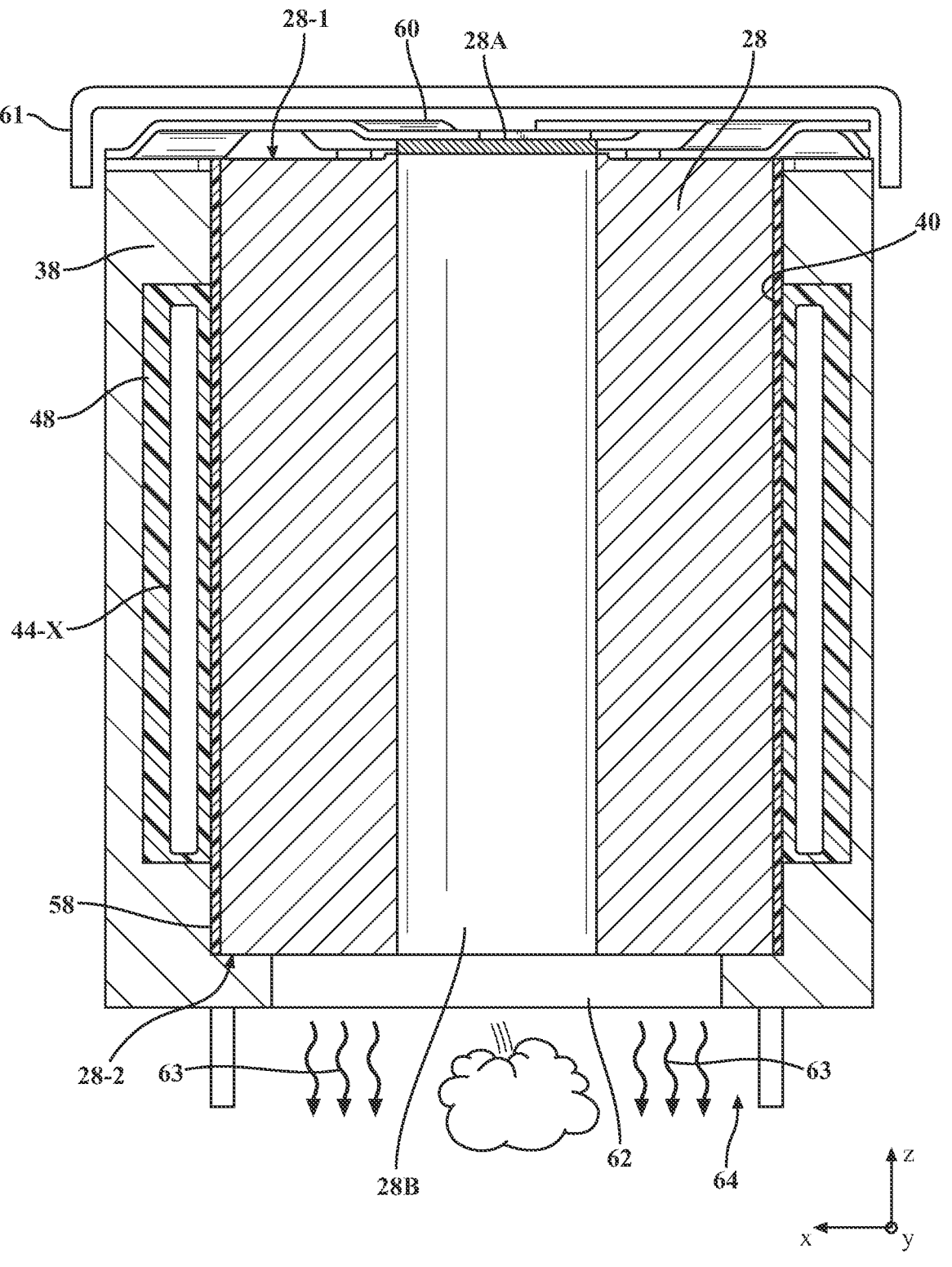
FIG. 5 is a schematic cross-sectional partial plan view of the cooling subsystem shown in FIG. 2, illustrating a battery cell arranged inside the one-piece cooling subsystem, according to the disclosure.

As shown in the cross-sectional view of the RESS 24 depicted in FIG. 5, each battery cell 28 may include a polyethylene terephthalate (PET) isolation layer 58 arranged on the outer surface of the respective battery cell. Consequently, in the assembled RESS 24, the PET isolation layer 58 may be disposed directly against the TIM 48. The PET isolation layer 58 is intended to provide a strong, rigid, high chemical resistance, and low sliding friction interface between an individual battery cell 28 and the TIM 48. The PET isolation layer 58 may have thickness in a range of 0.05-0.15 mm, with a target thickness of 0.1 mm. As shown in FIG. 5, each battery cell 28 may include a first end 28-1 and a second end 28-2. The first end 28-1 may have an electric terminal 28A, while the second end 28-2 may have a gas vent 28B. As shown in FIG. 3, the RESS 24 may additionally include a tab connector 60. The tab connector 60 is configured to electrically connect the electrical terminals 28A of the plurality of battery cells residing in the RESS. The tab connector 60 may be covered by a potting material 61 configured to physically protect and electrically isolate the tab connector from external interference and damage.

As shown in FIGS. 4 and 5, the cell holder 38 may define a plurality of integrated apertures 62, with each such aperture arranged at the bottom of a respective pocket 40. Each integrated aperture 62 may be configured to interface with the gas vent 28B of one of the battery cells 28 inserted into a respective pocket 40 of the cell holder 38, thereby facilitating removal of gases 63 emitted by the corresponding cell. The cell holder 38 may further include a longitudinal passage 64 extending along at least one row 30-1, 30-2, 30-3, or 30-4 of the plurality of battery cells 28. Each integrated aperture 62 may be configured to direct gases 63 vented by the corresponding battery cell 28, such as during a thermal runaway, into the longitudinal passage 64.

Figure 6:
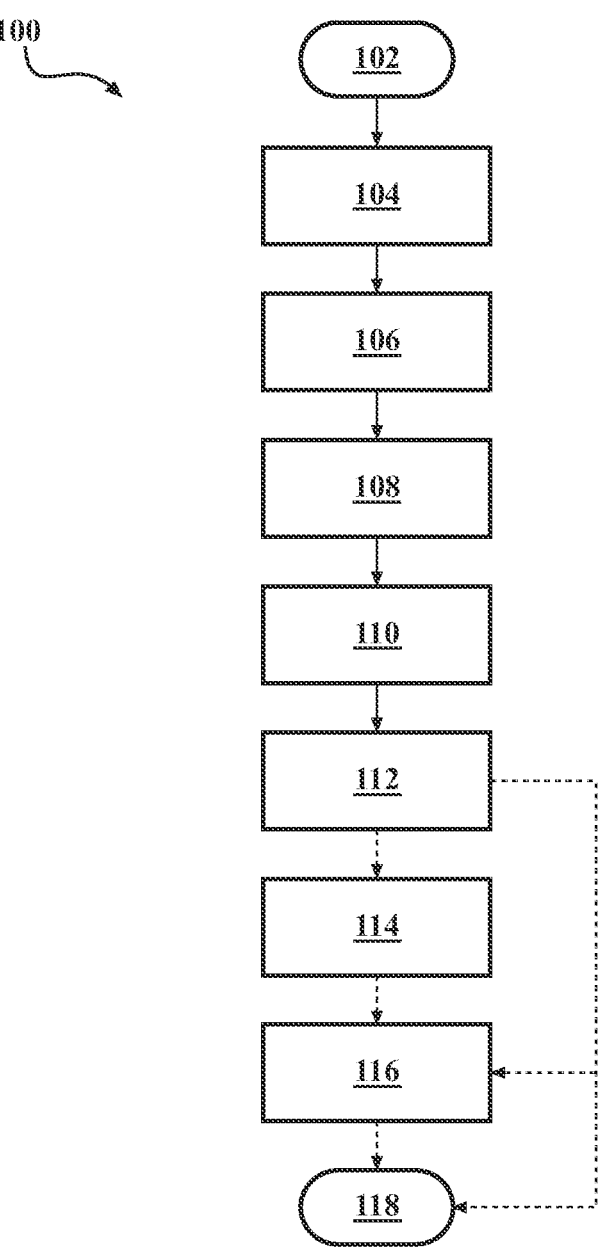
FIG. 6 illustrates a method of generating a multi-cell rechargeable energy storage system (RESS), including constructing the single-piece cooling subsystem shown in FIGS. 1-5.
Figure 7:
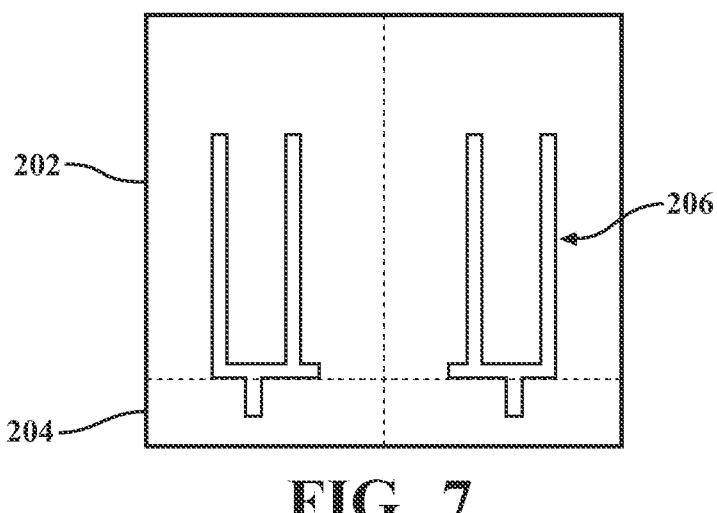
FIG. 7 illustrates an upper mold being engaged with a lower mold to form a cavity defining the cell holder, according to the method of FIG. 6.
Figure 8:
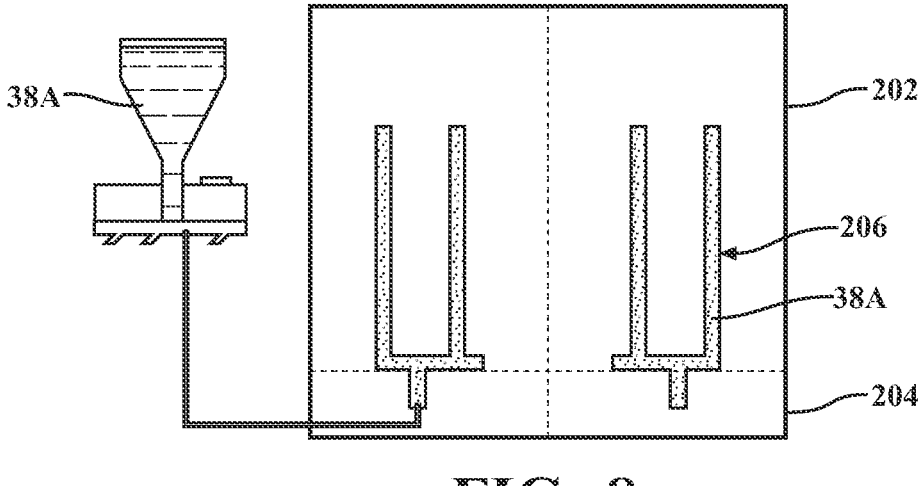
FIG. 8 illustrates injection of an impact-resistant material into the cavity defining the cell holder, according to the method of FIG. 6.
Figure 9:
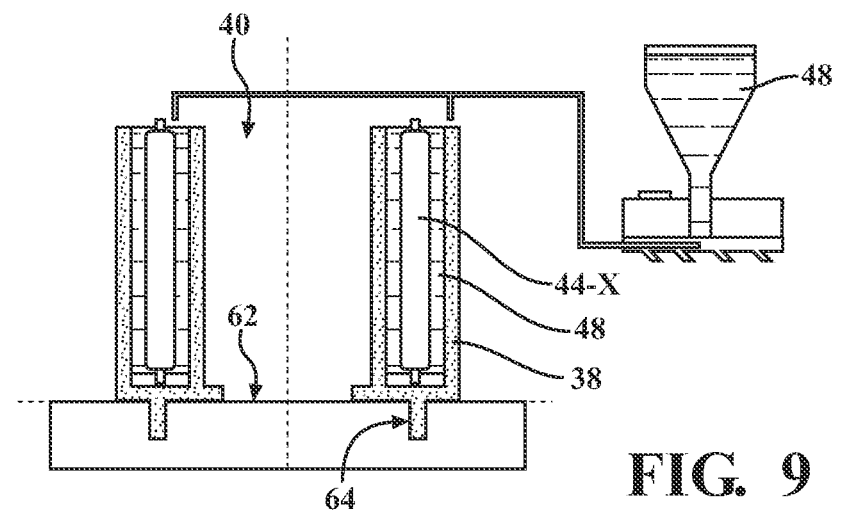
FIG. 9 illustrates injection of the TIM between individual ribbon coolant lines and the formed cell holder to generate the single-piece cooling subsystem, according to the method of FIG. 6.

A method 100 of generating a multi-cell rechargeable energy storage system (RESS) 10, including constructing the single-piece cooling subsystem 36 configured to remove thermal energy from battery cells 28 in the RESS, is shown in FIG. 6 and described below with reference to the structure shown in FIGS. 1-5 and a manufacturing process shown in FIGS. 7-9. Method 100 commences in frame 102 with engaging an upper mold 202 with a lower mold 204 to form a cavity 206 (shown in FIG. 7) defining the cell holder 38. Following frame 102, the method advances to frame 104. In frame 104, the method includes injecting the impact-resistant material 38A into the cavity 206 (shown in FIG. 8) to form the cell holder 38. From frame 104, the method moves on to frame 106. In frame 106, the method includes separating the upper mold 202 from the lower mold 204 to retrieve the formed cell holder 38. After frame 106, the method proceeds to frame 108.

In frame 108, the method includes arranging the coolant header 42 within the formed cell holder 38. As described above with respect to FIGS. 1-5, the coolant header 38 has a plurality of ribbon coolant lines, such as coolant lines 44-1, 44-2, 44-3, 44-4, 44-5 arranged in parallel for circulating the coolant between individual battery cells 28 of the RESS 10. After frame 108, the method proceeds to frame 110. In frame 110, the method includes injecting the thermal interface material (TIM) 48 between the individual ribbon coolant lines, e.g., 44-1, 44-2, 44-3, 44-4, 44-5 and indicated by numeral 44-X, and the formed cell holder 38 (shown in FIG. 9). Thus, as shown in the cross-sectional view and described with respect to FIG. 5, the TIM 48 over-molds and encases each ribbon coolant line 44-X to form the plurality of battery cell pockets 40 in the single-piece cooling subsystem 36.

Injecting the TIM 48 between the plurality of ribbon coolant lines and the formed cell holder 38 in frame 110 may also define in the single-piece cooling subsystem 36 the above-described plurality of integrated apertures 62. In the assembled RESS 10, each integrated aperture 62 is configured to interface with a respective gas vent 28B of one of the battery cells 28. Additionally, injecting the TIM 48 between the plurality of ribbon coolant lines and the formed cell holder 38 may define in the single-piece cooling subsystem 36 longitudinal passages 64 extending along individual rows 30-1, 30-2, 30-3, or 30-4 of the constituent battery cells 28. In such a formed structure of the single-piece cooling subsystem 36, during operation of the RESS 10, each integrated aperture may be configured to direct gases vented by a particular battery cell 28 to a corresponding longitudinal passage 64.

Following the injection of the TIM 48 in frame 110, the entire single-piece cooling subsystem 36 structure is permitted to cool to approximately ambient or room temperature in frame 112. Following frame 112, the method may advance to frame 114. In frame 114, following injection of the TIM 48, the method includes inserting the battery cells 28 into respective formed battery cell pockets 40, such that the polyethylene terephthalate (PET) isolation layer 58 is disposed directly against the TIM. Following either of the frames 112 or 114, the method may proceed to frame 116 for completion of the assembly of the RESS 10 or conclude in frame 118. Overall, method 100 is intended to generate a single-piece cooling subsystem 36 by over-molding ribbon coolant lines with a multi-pocket cell holder. The single-piece cooling subsystem 36 is structured to retain battery cells 28 the RESS 10 and facilitate removal of thermal energy from the constituent battery cells, such as by routing high-temperature gases along preformed passage(s).

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A multi-cell rechargeable energy storage system (RESS) comprising:
    a plurality of battery cells arranged in rows;
    a single-piece cooling subsystem configured to remove thermal energy from the plurality of battery cells and including:

a cell holder constructed from an impact-resistant material defining a plurality of pockets, wherein each pocket is configured to accept and retain one of the plurality of battery cells; and a coolant header disposed within the cell holder and having a plurality of ribbon coolant lines arranged in parallel and configured to circulate a coolant, wherein:

each ribbon coolant line is, in a cross-sectional view, arranged inside the cell holder and over-molded with and encased by a thermal interface material (TIM); and each pair of adjacent ribbon coolant lines embraces one row of the plurality of battery cells.

2. The multi-cell RESS of claim 1, wherein each of the plurality of battery cells includes a polyethylene terephthalate (PET) isolation layer, and wherein the PET isolation layer is disposed directly against the TIM.

3. The multi-cell RESS of claim 2, wherein, in the cross-sectional view, the PET isolation layer has a 0.1 mm thickness.

4. The multi-cell RESS of claim 1, wherein each of the plurality of battery cells includes a first end having an electric terminal, the multi-cell RESS further comprising a tab connector configured to electrically connect the electric terminals of the plurality of battery cells.

5. The multi-cell RESS of claim 4, wherein the tab connector is covered by a potting material.

6. The multi-cell RESS of claim 4, wherein:

each of the plurality of battery cells includes a second end having a gas vent;

the cell holder defines a plurality of integrated apertures; and each integrated aperture is configured to interface with a respective gas vent of one of the plurality of battery cells.

7. The multi-cell RESS of claim 6, wherein the cell holder includes a longitudinal passage extending along at least one row of the plurality of battery cells, and wherein each of the plurality of integrated apertures is configured to direct a gas vented by one of the plurality of battery cells to the longitudinal passage.

8. The multi-cell RESS of claim 1, wherein the impact-resistant material of the cell holder is one of acrylonitrile butadiene styrene (ABS), polycarbonate (PC), and polydicyclopentadiene (pDCPD).

9. The multi-cell RESS of claim 1, further comprising an inlet manifold configured to connect with the inlet fitting and an outlet manifold configured to connect with the outlet fitting, such that the inlet and outlet manifolds are together configured to circulate coolant through the coolant header.

10. The multi-cell RESS of claim 1, wherein each of the plurality of battery cells is a cylindrical cell.

11. A method of constructing a single-piece cooling subsystem configured to remove thermal energy from a plurality of battery cells in a multi-cell rechargeable energy storage system (RESS), the method including:

engaging an upper mold with a lower mold to form a cavity defining a cell holder;

injecting an impact-resistant material into the cavity to form the cell holder;

separating the upper mold from the lower mold to retrieve the formed cell holder;

arranging a coolant header within the formed cell holder, wherein the coolant header has a plurality of ribbon coolant lines arranged in parallel and configured to circulate a coolant between individual battery cells; and injecting a thermal interface material (TIM) between the plurality of ribbon coolant lines and the formed cell holder to, in a cross-sectional view, over-mold and encase each ribbon coolant line by the TIM and form a plurality of battery cell pockets.

12. The method of claim 11, wherein each of the plurality of battery cells includes a polyethylene terephthalate (PET) isolation layer, further comprising, following injecting the TIM, inserting the plurality of battery cells into respective battery cell pockets, such that the PET isolation layer is disposed directly against the TIM.

13. The method of claim 12, wherein, in the cross-sectional view, the PET isolation layer has a 0.1 mm thickness.

14. The method of claim 11, wherein injecting the TIM between the plurality of ribbon coolant lines and the formed cell holder additionally defines in the single-piece cooling subsystem a plurality of integrated apertures, and wherein each integrated aperture is configured to interface with a respective gas vent of one of the plurality of battery cells.

15. The method of claim 14, wherein injecting the TIM between the plurality of ribbon coolant lines and the formed cell holder additionally defines in the single-piece cooling subsystem a longitudinal passage extending along at least one row of the plurality of battery cells, and wherein each of the plurality of integrated apertures is configured to direct a gas vented by one of the plurality of battery cells (through the gas vent) to the longitudinal passage.

16. The method of claim 11, wherein the impact-resistant material of the cell holder is one of acrylonitrile butadiene styrene (ABS), polycarbonate (PC), and polydicyclopentadiene (pDCPD).

17. A single-piece cooling subsystem for removing thermal energy from a plurality of cylindrical battery cells arranged in rows in a multi-cell rechargeable energy storage system (RESS), the single-piece cooling subsystem including:

a cell holder constructed from an impact-resistant material defining a plurality of pockets, wherein each pocket is configured to accept and retain one of the plurality of cylindrical battery cells; and a coolant header disposed within the cell holder and having a plurality of ribbon coolant lines arranged in parallel and configured to circulate a coolant between individual cylindrical battery cells, wherein:

each ribbon coolant line is, in a cross-sectional view, arranged inside the cell holder and over-molded by a thermal interface material (TIM); and each pair of adjacent ribbon coolant lines embraces one row of the plurality of cylindrical battery cells.

18. The single-piece cooling subsystem of claim 17, wherein the cell holder defines a plurality of integrated apertures, and wherein each integrated aperture is configured to interface with a respective gas vent of one of the plurality of battery cells.

19. The single-piece cooling subsystem of claim 18, wherein the cell holder includes a longitudinal passage extending along at least one row of the plurality of battery cells, and wherein each of the plurality of integrated apertures is configured to direct a gas vented by one of the plurality of cylindrical battery cells to the longitudinal passage.

20. The single-piece cooling subsystem of claim 17, wherein the impact-resistant material of the cell holder is one of acrylonitrile butadiene styrene (ABS), polycarbonate (PC), and polydicyclopentadiene (pDCPD).

* * * * *